United States Patent [19]

Fernandez

[11] Patent Number: 5,434,013
[45] Date of Patent: Jul. 18, 1995

[54] LOW VOLTAGE ILLUMINATED AUTOMOBILE TRIM

[76] Inventor: Robert Fernandez, 10345 NW. 35 Ct., Miami, Fla. 33147

[21] Appl. No.: 145,759
[22] Filed: Oct. 29, 1993
[51] Int. Cl.⁶ .............................................. B32B 9/10
[52] U.S. Cl. ...................................... 428/690; 428/31; 428/58; 428/172; 428/192; 428/195; 428/913; 428/917; 313/504; 313/506
[58] Field of Search .................. 428/690, 917, 457, 58, 428/31, 192, 172, 195, 913, 917; 313/504, 506

[56] References Cited

U.S. PATENT DOCUMENTS

| | | | |
|---|---|---|---|
| 4,547,703 | 10/1985 | Fujita et al. | 428/690 |
| 5,120,618 | 6/1992 | Mori et al. | 428/690 |
| 5,156,924 | 10/1992 | Taniguchi et al. | 428/690 |
| 5,188,901 | 2/1993 | Shimiza | 428/421 |
| 5,302,468 | 4/1994 | Namiki et al. | 428/690 |
| 5,306,572 | 4/1994 | Ohashi et al. | 428/690 |

Primary Examiner—Patrick J. Ryan
Assistant Examiner—Abraham Bahta
Attorney, Agent, or Firm—Robert J. Van Der Wall

[57] ABSTRACT

A luminescent automobile trim apparatus includes structure for positioning on a portion of an automobile to render the portion visible at night an electroluminescent strip formed of several layers of material joined together substantially face to face, including a layer of conductive film, under a first layer of phosphor of a certain first color, under a first layer of electrode material, for radiating light of a certain color. The apparatus preferably additionally includes a structure for altering electrical frequency and voltage applied to the first layer of electrode material for changing the color of the radiated light. The structure for altering preferably includes a musical sound system; where the frequency and voltage are controlled by electrical representations of music within the sound system, such that color changes are synchronized with changes in the electrical representations. The apparatus alternatively additionally includes a second layer of phosphor of a certain second color and an adjacent second layer of electrode material, and structure for selectively directing electric current to one of these layers of electrode material, for activating the particular layer of phosphor material to radiate light of a color corresponding to the phosphor color.

19 Claims, 5 Drawing Sheets

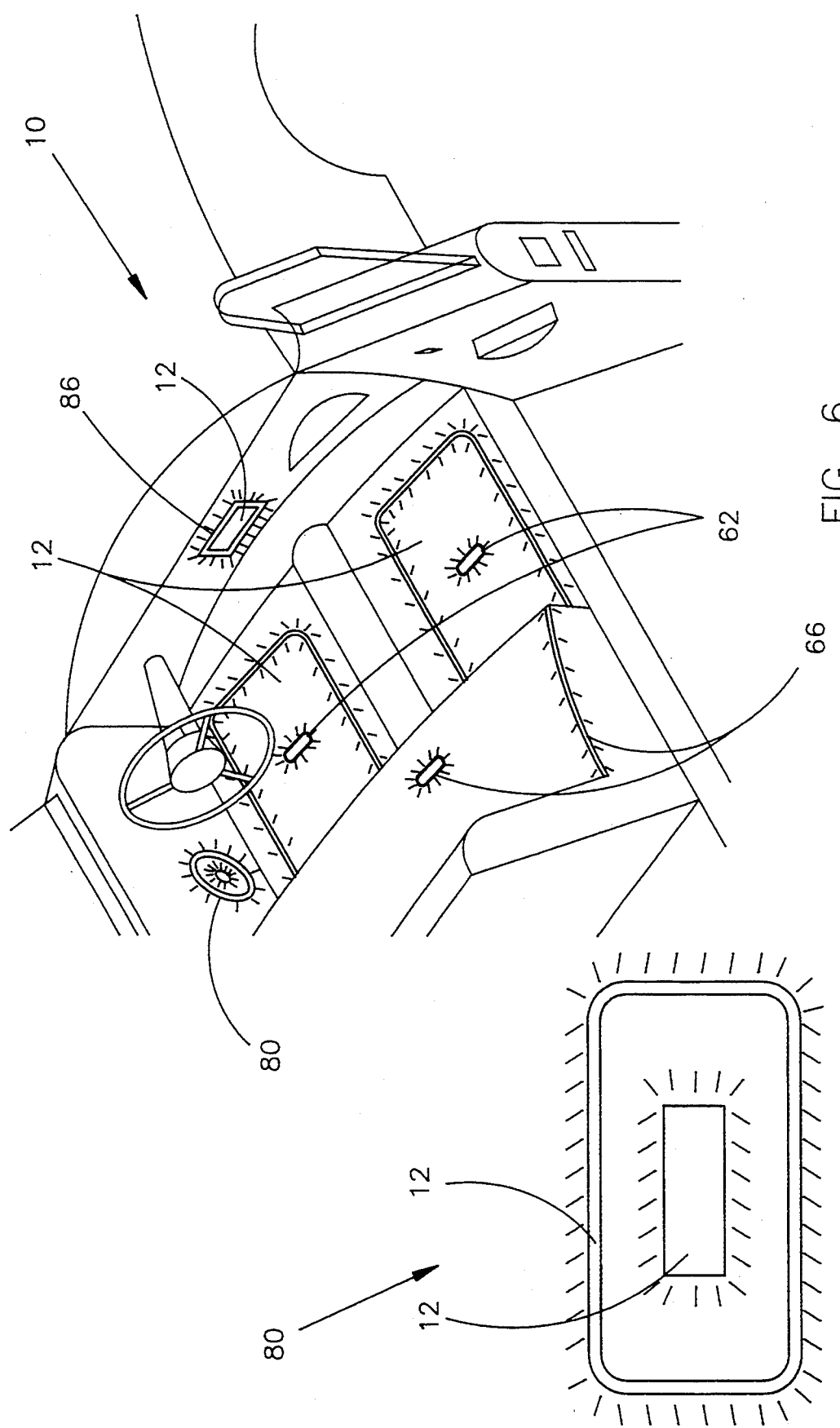

LOW VOLTAGE ILLUMINATED AUTOMOBILE TRIM

BACKGROUND OF THE INVENTION

1. Field of the Invention

The present invention relates generally to the field of illuminated trim for automobiles, and more specifically to an apparatus for illuminating automobile molding, floor mats, emblems, license plate frames, speaker covers and other accessories with safe, low voltage strips known as electroluminescent displays to supplement and replace existing breakable and fire hazardous neon fixtures such as are currently used along rocker panels and around license plate frames, these low voltage strips being inventively adapted for use on automobiles and including a conventional multilayered structure, having a bottom layer of protective film, under a layer of foil, under a layer of phosphor, under a layer of transparent electrode material, and a protective top layer, all being joined together face to face, and preferably provided with inventive means for changing displayed color at will in either of two ways, one way being by altering strip voltage and frequency with an inventive electric circuit, and the other way being by providing a plurality of phosphor layers, each of a different phosphor color, and selectively activating any one such layer, to accommodate owner preferences for specific colors or for color variety, or to change color with musical beat or note changes from a sound system, or to create lighted license plate frames which match rather than illegally alter radiated license plate colors.

2. Description of the Prior Art

In recent years, various types of illuminated trim have been developed for automobiles. These, however, have all presented problems of expense, danger or possible illegality.

One common example is the neon tubes mounted along the rocker panels of automobiles and known as "ground effects." These neon tubes have the disadvantage of being readily breakable in an environment which almost constantly exposes them to potential impact damage. They are also inflexible, and therefore unable to follow the various body contours of some modern automobiles. More important is that these neon tubes operate at relatively high voltages, and as a result present a fire hazard.

Another common example is the colored light frame or border around license plates. These frames are typically either neon bulbs, having the above-identified disadvantages, or translucent tubes containing strings of light sources wired in electrical series. These colored light frames can alter the apparent color of license plates at night, making the plates less identifiable with the issuing State. Such alteration of displayed color is probably illegal in many states. In addition, the relatively high intensity of light thrown by these frames also presents a distracting road hazard for other drivers.

It is thus an object of the present invention to provide a lighting means which is suitable for automobile trim such as ground effects, license plate frames, speaker covers, floor mats and emblems, and which operates at a safe, low voltage.

It is another object of the present invention to provide such a lighting means which have means for changing radiated color at will and to conform to the license plate State identifying colors.

It is another object of the present invention to provide such a lighting means which is physically flexible and can therefore follow the various contours of a variety of automobile models, and can be cut to virtually any shape.

It is still another object of the present invention to provide such a lighting means which is not excessively bright and thus does not dangerously distract other drivers from their driving.

It is finally an object of the present invention to provide such a lighting means which is reliable, virtually nonbreakable and relatively inexpensive.

SUMMARY OF THE INVENTION

The present invention accomplishes the above-stated objectives, as well as others, as may be determined by a fair reading and interpretation of the entire specification.

A luminescent automobile trim apparatus is provided, including structure for positioning on a portion of an automobile to render the portion visible at night an electroluminescent strip formed of several layers of material joined together substantially face to face, including a layer of conductive film, under a first layer of phosphor of a certain first color, under a first layer of electrode material, for radiating light of a certain color.

The apparatus preferably additionally includes a structure for altering electrical frequency and voltage applied to the first layer of electrode material for changing the color of the radiated light. The structure for altering preferably includes a musical sound system; where the frequency and voltage are controlled by electrical representations of music within the sound system, such that color changes are synchronized with changes in the electrical representations.

The apparatus alternatively additionally includes a second layer of phosphor of a certain second color and an adjacent second layer of electrode material, and structure for selectively directing electric current to one of these layers of electrode material, for activating the particular layer of phosphor material to radiate light of a color corresponding to the phosphor color.

The sound system optionally includes a frequency discriminator, and the frequency and voltage are controlled by the frequency discriminator, and the structure for selecting is controlled by electrical representations of music in the sound system, so that color changes are synchronized with changes in the electrical representations of music. The sound system includes an equalizer, and the structure for selecting is controlled by the equalizer.

The first layer of phosphor optionally includes discrete patches of phosphor of at least two different colors. At least one patch may be shaped to form a letter of an alphabet. At least two of these patches may be contiguous with each other, or may be spaced apart from each other.

A luminescent automobile trim apparatus, including an automobile having automobile portions, a structure for positioning on a portion of an automobile to render the portion visible at night an electroluminescent strip formed of several layers of material joined together substantially face to face, including a layer of conductive film, under a first layer of phosphor of a certain first color, under a first layer of electrode material, for radiating light of a certain color.

The portion of the automobile may include a floor mat, an emblem, a speaker cover, a license plate frame, rocker panel molding, dash trim, lock molding, or outer automobile body trim.

BRIEF DESCRIPTION OF THE DRAWINGS

Various other objects, advantages, and features of the invention will become apparent to those skilled in the art from the following discussion taken in conjunction with the following drawings, in which:

FIG. 2a is a block diagram for an electroluminescent light display which is frequency sensitive and which produces a bar graph or light organ type of effect.

FIG. 6 is a perspective partial side view of an automobile with the front passenger door open to reveal several embodiments of the inventive automobile trim inside the automobile.

FIG. 7 is a top view of a speaker cover having an EL illuminated center emblem and an EL illuminated perimeter or frame.

DETAILED DESCRIPTION OF THE PREFERRED EMBODIMENTS

Figure 1:
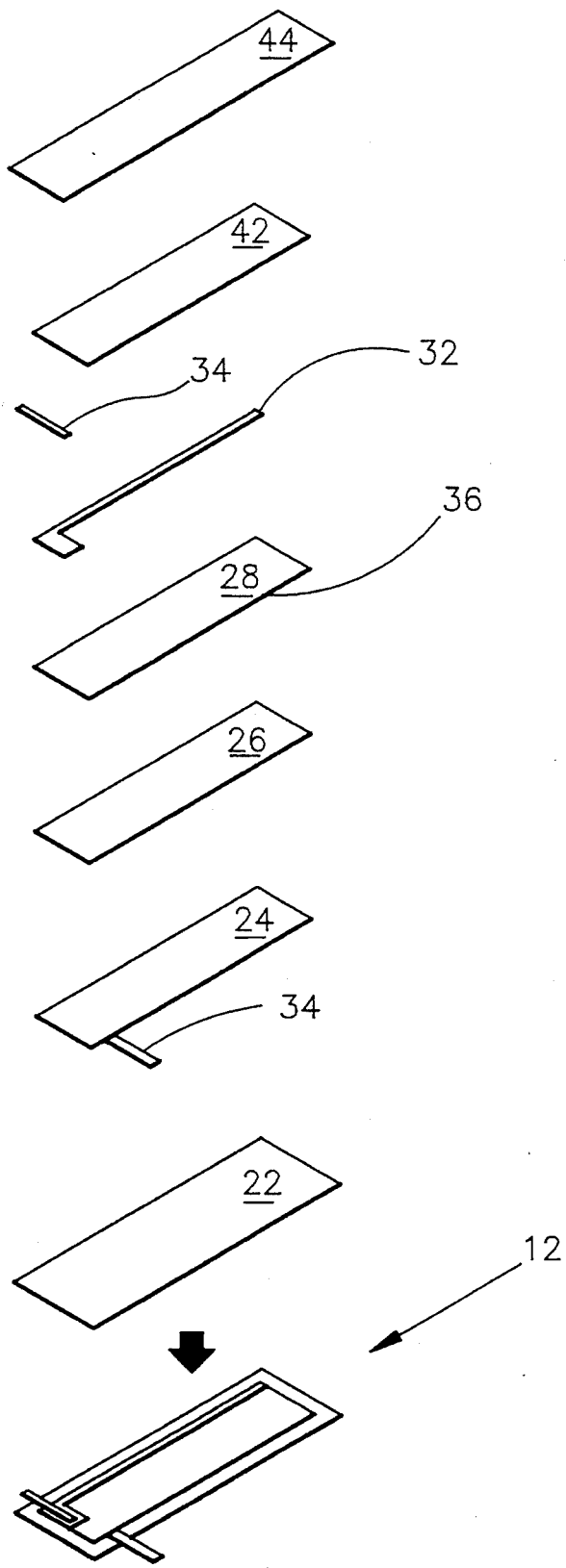
FIG. 1 is a perspective exploded illustration of the several apparatus layers which combine face to face to form the basic illuminating structure.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–7, an illuminated trim apparatus 10 for automobiles is disclosed. Trim apparatus 10 takes the form of automobile floor mats, splash guards, wheel trim, door guards, trunk and door lock trim, outer and inner body trim, sun shades, accent trim for the dash or radio, hood logo and emblem trim, license plate frames, speaker covers and side molding such as ground effects and door panel decorative strips.

Strip Structure

Apparatus 10 includes safe, low voltage lighting strips 12, known as electroluminescent lighting or "EL", to supplement or replace existing breakable and fire hazardous fixtures. Strips 12 are preferably constructed according to generally known methods, but with inventive new illuminating functions, structures and features. Strips 12 are multi-layered assemblies sandwiched and bonded together face to face. See FIG. 1. These strips 12 typically include a bottom layer of protective film 22, under a layer of foil 24, under a layer of phosphor 26, under a layer of transparent electrode material 28, with a bus bar 32 having a front lead 34 and extending along an electrode longitudinal edge 36 for more efficient current delivery, under a desiccant layer 42, under a top layer of protective and translucent film 44. These layers are all preferably of flexible material, to make strip 12 flexible.

Inventive Color Altering Assemblies

Figure 2:
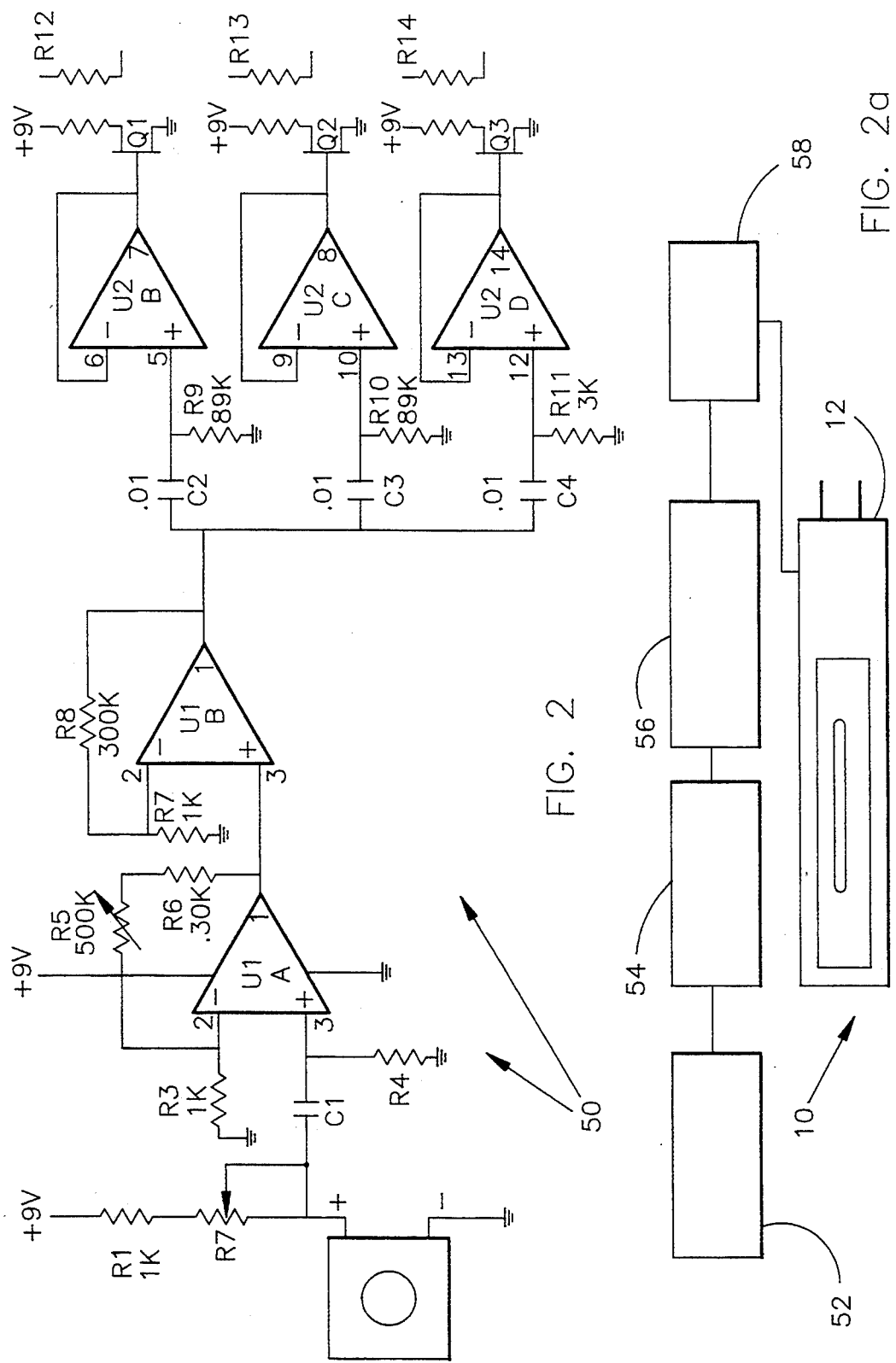
FIG. 2 is a schematic of the inventive electric circuit for changing strip voltage and frequency to change radiated color of a particular phosphor layer.

Strips 12 are preferably inventively adapted by means of a circuit 50 to change radiated strip 12 color at the will of the user by changing strip 12 voltage and frequency. See FIGS. 2 and 2a. FIG. 2a shows block diagrams for an electroluminescent light (EL) display which is frequency sensitive and which produces a bar graph or light organ type of effect. This circuit separates audio frequencies. It then channels these separated frequencies through a high voltage generator to produce different colors and patterns, producing the previously mentioned effect.

The first block is called the microphone pre-amp circuit 52. A microphone is normally connected to this circuit 52 and this circuit 52 acts as a preamplifier for the microphone. This circuit 52 consists of U1A, an audio amplifier, and resistors and capacitor, notably R4 and C1, which allows a certain desirable audio range into the device. R5 is a variable resistor and sets the gain on U1A. This audio signal then goes to an amplified circuit 54 comprising U1B. U1B simply amplifies the signal to a workable level. The output of amplified circuit 54 is then fed into the EL frequency discriminator 56 which is a bank of filter amplifier sets. These filter amplifier sets further break down the audio signal into specific frequencies determined by the end usage or desired effect of the device. The filter amplifier sets can comprise as few or as many sets as needed, again dependent upon the end usage. This broken down signal is then fed to the final stage comprising an EL driver 58. EL driver 58 steps the voltage to an EL level through the use of a simple transistor and step up transformer. Circuit 50, as can be seen, was built with simplicity and functionality in mind.

This color change feature accommodates momentary preferences for specific colors and color variety. This feature makes possible lighted license plate frames which can be adjusted to match rather than illegally contrast with and alter license plate radiated colors.

Figure 3:
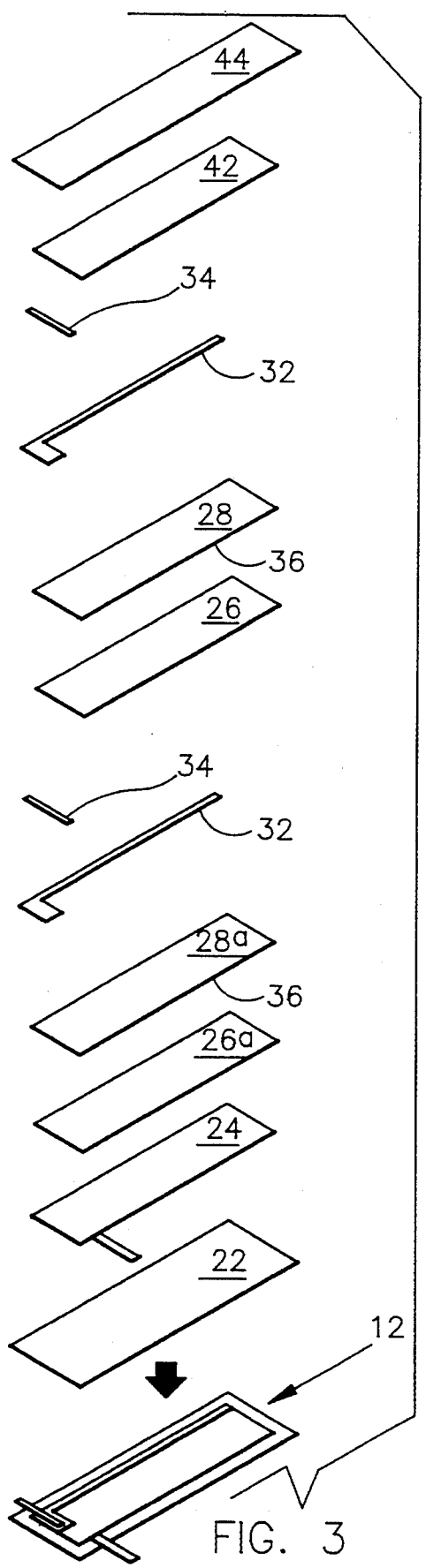
FIG. 3 is a perspective exploded illustration of the several apparatus layers which combine face to face to form the basic illuminating structure, but with the inventive added second phosphor layer of a second color and adjacent second electrode layer for providing a second radiated strip color to select.
Figure 4:
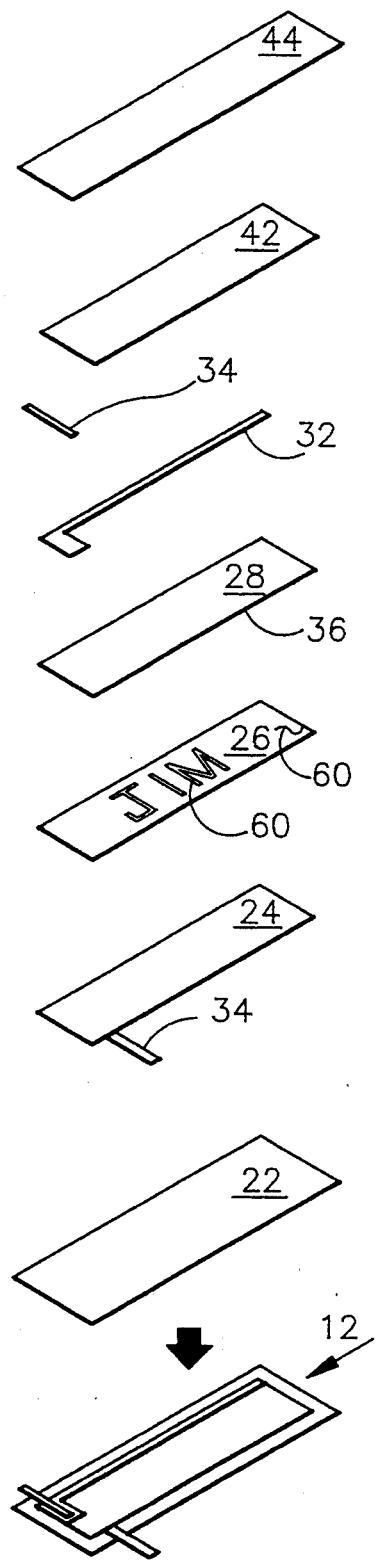
FIG. 4 is a perspective exploded illustration of the several apparatus layers which combine face to face to form the basic illuminating structure, but with the inventive phosphor layer formed of patches of different phosphor colors, shaped to represent letters of the alphabet.
Figure 5:
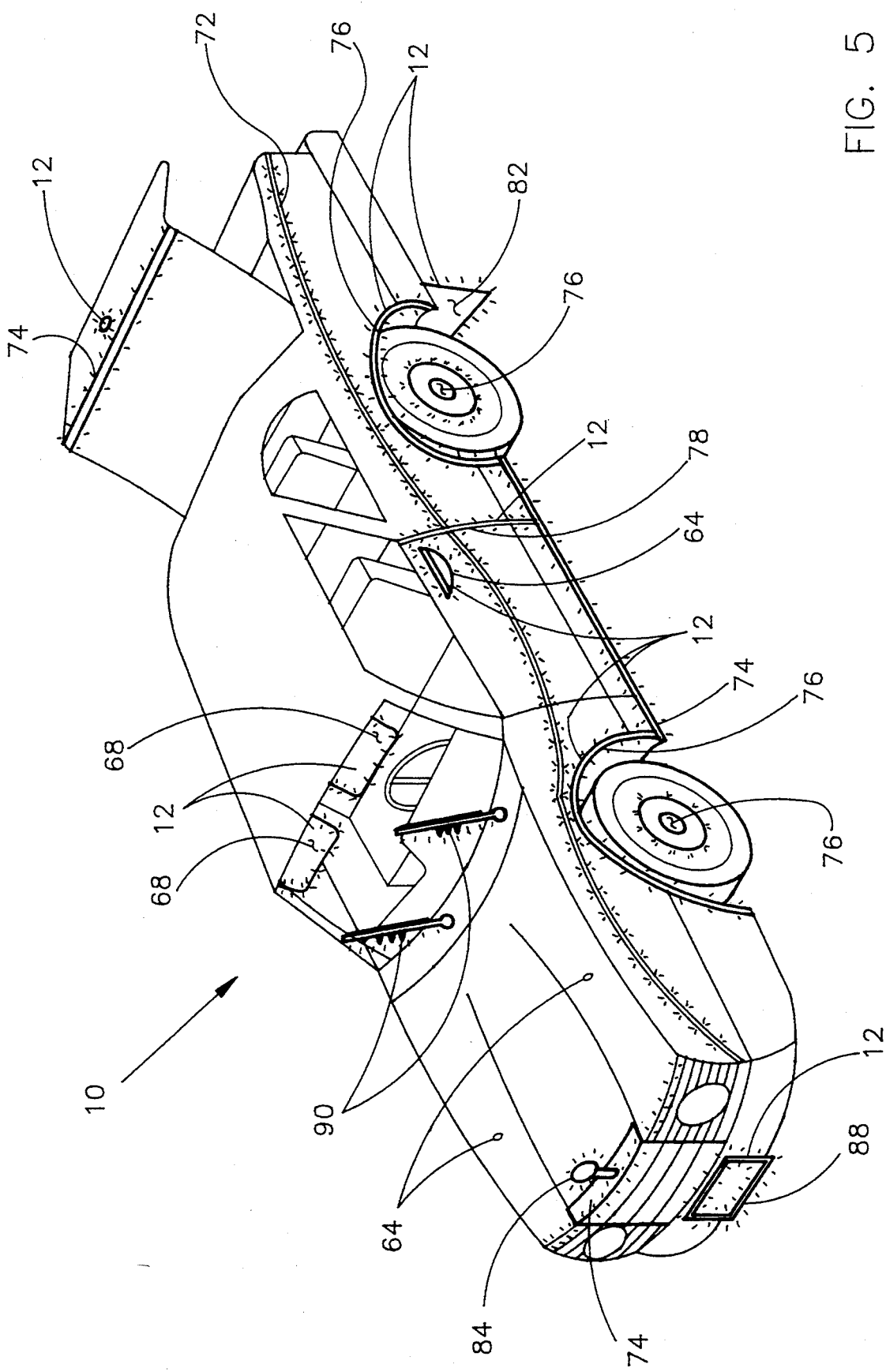
FIG. 5 is a perspective frontal view of an automobile, showing several embodiments of the inventive automobile trim on the outside of the automobile.

Another inventive way to alter color is to provide two or more phosphor layers, such as layers 26 and 26a illustrated in FIG. 3. Then one layer, 26 or 26a, is selected and activated by current passing through either electrode layer 28 or 28a, to display its particular color. This selection may be made manually by using a switch to direct current to electrode layer 28 or 28a adjacent the desired phosphor color layer 26 or 26a, respectively.

Color changing may also be synchronized with the beat or notes of music playing in a sound system in the automobile. To accomplish this, the color selecting switch is preferably tied into a frequency discriminator or equivalent device.

An inventive way to mix color is to form the phosphor layer 26 or 26a of adjacent phosphor patches 60 of different colors. Then, when the electrode material 28 or 28a is charged, phosphor layer 26 or 26a, respectively, will simultaneously display multiple colors with predetermined patch 60 shapes and contours. See FIG. 4. Patches 60 may form letters, such as a person's name, and may be either spaced apart from each other or substantially contiguous.

Safety Enhancing Embodiments

It is noted that safety is enhanced in general by illuminating an automobile at night with low intensity light. A person is less likely to bump into part of their automobile when stepping into or out of it when portions are illuminated to reveal their locations. This is why certain of the above-mentioned inventively illuminated trim embodiments enhance safety, including the illuminated floor mats 62, door and hood lock trim 64 and seat covers and emblems on seat covers 66, and sun shades 68. Safety is also enhanced when external portions of an automobile are illuminated so that other drivers, particularly in adjacent lanes, can better see its location and position. These illuminated external trim portions include side molding 72 and rocker panel, spoiler and hood and trunk trim 74, wheel trim 76, door guards 78, speaker covers 80, and splash guards 82. See FIGS. 5, 6 and 7.

Style Enhancing Embodiments

Style is also enhanced with illuminated trim portions such as decals and hood emblems 84 with internal illumination shining through open sections of screens or stencil-like forms, license plate frames 88, and dash and radio accent trim 86, and windshield wiper wind anchoring fins 90.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An automobile comprising:
an automobile surface portion shaped to create a distinguishing artistic appearance,
an electroluminescent strip formed of a plurality of layers of material joined together substantially face to face, comprising a layer of conductive film, under a first layer of phosphor of a certain first color, under a first layer of electrode material, for radiating light of a certain color, having a perimetric edge shaped to follow and highlight said surface portion,
means for positioning on said surface portion said electroluminescent strip to render said surface portion visible in the dark for causing said surface portion to convey its artistic shape in the dark.

2. The apparatus of claim 1, additionally comprising means for altering electrical frequency and voltage applied to said first layer of electrode material for changing the color of said radiated light.

3. The apparatus of claim 2, additionally comprising:
a musical sound system;
wherein said frequency and voltage are controlled by electrical representations of music within said sound system, such that color changes are synchronized with changes in said electrical representations.

4. The apparatus of claim 1, additionally comprising a second layer of phosphor of a certain second color and an adjacent second layer of electrode material, and means for selectively directing electric current to one said layer of electrode material, for activating said layer of phosphor material to radiate light of a color corresponding to said phosphor color.

5. The apparatus of claim 3, wherein said sound system comprises a frequency discriminator, and said frequency and voltage are controlled by said equalizer.

6. The apparatus of claim 4, wherein said means for selecting is controlled by electrical representations of music in said sound system, such that color changes are synchronized with changes in said electrical representations of music.

7. The apparatus of claim 6, wherein said sound system comprises an equalizer, and said means for selecting is controlled by said equalizer.

8. The apparatus of claim 1, wherein said first layer of phosphor comprises discrete patches of phosphor of at least two colors.

9. The apparatus of claim 8, wherein at least one said patch is shaped to form a letter of an alphabet.

10. The apparatus of claim 8, wherein at least two said patches are contiguous with each other.

11. The apparatus of claim 8, wherein at least two said patches are spaced apart from each other.

12. An automobile floor mat apparatus, comprising:
a sheet of flexible mat material having an upper surface,
an electroluminescent strip formed of a plurality of layers of material joined together substantially face to face, comprising a layer of conductive film, under a first layer of phosphor of a certain first color, under a first layer of electrode material, for radiating light of a certain color secured to said upper surface of said sheet of flexible mat material to render said mat visible in the dark for aiding automobile occupants in safely gaining their footing without dependency upon automobile cabin lights.

13. The apparatus of claim 1, wherein said portion of said automobile comprises an emblem.

14. The apparatus of claim 1, wherein said portion of said automobile comprises a speaker cover.

15. The apparatus of claim 1, wherein said portion of said automobile comprises a license plate frame.

16. The apparatus of claim 1, wherein said portion of said automobile comprises rocker panel molding.

17. The apparatus of claim 1, wherein said portion of said automobile comprises dash trim.

18. The apparatus of claim 1, wherein said portion of said automobile comprises lock molding.

19. The apparatus of claim 1, wherein said portion of said automobile comprises outer automobile body trim.

* * * * *